(12) United States Patent
Watanabe et al.

(10) Patent No.: US 9,236,591 B2
(45) Date of Patent: Jan. 12, 2016

(54) BATTERY PACK

(71) Applicant: Lithium Energy Japan, Kyoto-shi (JP)

(72) Inventors: Minoru Watanabe, Shiga (JP); Toshiki Kusunoki, Shiga (JP); Yo Hasegawa, Shiga (JP)

(73) Assignee: GS Yuasa International Ltd., Kyoto-shi, Kyoto (JP)

( * ) Notice: Subject to any disclaimer, the term of this patent is extended or adjusted under 35 U.S.C. 154(b) by 168 days.

(21) Appl. No.: 13/631,499

(22) Filed: Sep. 28, 2012

(65) Prior Publication Data
US 2013/0084478 A1     Apr. 4, 2013

(30) Foreign Application Priority Data

Sep. 30, 2011  (JP) ................................. 2011-217523
Sep. 6, 2012   (JP) ................................. 2012-195979

(51) Int. Cl.
| | |
|---|---|
| H01M 2/10 | (2006.01) |
| H01M 10/625 | (2014.01) |
| H01M 10/6563 | (2014.01) |
| H01M 10/617 | (2014.01) |
| H01M 10/613 | (2014.01) |
| H01M 10/658 | (2014.01) |

(52) U.S. Cl.
CPC .......... *H01M 2/1077* (2013.01); *H01M 10/613* (2013.01); *H01M 10/617* (2013.01); *H01M 10/625* (2013.01); *H01M 10/658* (2013.01); *H01M 10/6563* (2013.01)

(58) Field of Classification Search
CPC ............ H01M 2/1077; H01M 10/625; H01M 10/613; H01M 10/617; H01M 10/658

USPC .......................................................... 429/83
See application file for complete search history.

(56) References Cited

U.S. PATENT DOCUMENTS

| | | | | |
|---|---|---|---|---|
| 6,828,755 | B1* | 12/2004 | Iverson et al. | 320/104 |
| 2007/0216371 | A1* | 9/2007 | Yoon et al. | 320/150 |
| 2010/0297486 | A1 | 11/2010 | Fujii | |
| 2011/0240251 | A1* | 10/2011 | Fujiwara | 165/51 |

FOREIGN PATENT DOCUMENTS

| | | |
|---|---|---|
| JP | 2006-24510 A | 1/2006 |
| JP | 2006-024510 A | 1/2006 |
| JP | 2008-251378 A | 10/2008 |
| JP | 2010-15951 A | 1/2010 |

OTHER PUBLICATIONS

Machine translation of JP 2008251378 obtained Apr. 14, 2014.*
Extended European Search Report dated Feb. 1, 2013.
European Search Report dated Feb. 1, 2013.
United States Office Action dated Apr. 3, 2015 in U.S. Appl. No. 13/629,271.

* cited by examiner

*Primary Examiner* — Nicholas P D'Aniello
(74) *Attorney, Agent, or Firm* — McGinn IP Law Group, PLLC

(57) ABSTRACT

Even if a junction box is laid out such that a region where a battery cell is disposed is divided, the battery cell is effectively cooled. A battery pack includes: a battery pack case (1) including a junction box accommodating portion (10) and a battery accommodating portions (7, 8a, 8b); and a plurality of batteries (2) accommodated in the battery accommodating portions (7, 8a, 8b) of the battery pack case (1). The junction box accommodating portion (10) is covered with shield members (21, 22, 23).

20 Claims, 6 Drawing Sheets

BATTERY PACK

CROSS-REFERENCE TO RELATED APPLICATIONS

This application claims priority from Japanese Patent Application Nos. 2011-217523 and 2012-195979, the disclosures of which are incorporated herein by reference in their entireties.

BACKGROUND OF THE INVENTION

1. Field of the Invention

The present invention relates to a battery pack, more particularly, to a battery pack having characteristics in its cooling structure of a battery cell accommodated in the battery pack.

2. Description of the Related Art

As a conventional battery pack, there is a battery pack including a junction box and a battery-cooling fan for cooling a battery (battery cell) (see JP 2006-24510 A for example).

However, the conventional battery pack employs such a layout that the junction box and the battery cell are completely separated from each other. Further, it is difficult to effectively cool the battery cell.

SUMMARY OF THE INVENTION

It is an object of the present invention to provide a battery pack which incorporates a junction box therein and which is capable of effectively cooling a battery cell.

According to an aspect of the present invention, a battery pack includes a battery pack case including a junction box accommodating portion and a battery accommodating portion; and a plurality of batteries accommodated in the battery accommodating portion of the battery pack case, wherein the junction box accommodating portion is covered with a shield member.

Here, the expression that the junction box accommodating portion is covered with the shield member includes a state where the entire junction box accommodating portion is covered and a state where the junction box accommodating portion is only surrounded. In short, this expression is not limited if it is possible to prevent air from flowing into the junction box accommodating portion.

It is possible to prevent air from flowing into the junction box accommodating portion, and to stabilize the supply of air to the battery which is required to be cooled, and an amount of air which flows along a surface of the battery can sufficiently be secured.

According to an aspect of the invention, the battery pack case may include an air-suction portion and an air-exhaust portion, and at least a portion of the batteries is disposed on a side of the air-exhaust portion with respect to the junction box accommodating portion.

The battery may be located in the flow of air flowing toward the air-exhaust portion while avoiding the junction box accommodating portion by the shield member, and the battery is cooled by the passing air.

The shield member may be made of material having insulation properties, and the shield member covers an electronic part at least in the junction box.

It is possible to secure the insulation properties of the electronic parts in the junction box, to prevent air from flowing in, and to effectively cool the battery.

The shield member may include a junction box cover which covers a control unit in the junction box.

A specific electronic part in the junction box can previously be covered with the junction box cover.

The shield member further may include an auxiliary cover which covers a region from the junction box cover to a side surface in the battery pack case.

A specific electronic part in the junction box is covered with the junction box cover and then, other electronic parts can be covered with the auxiliary cover. Therefore, it is possible to enhance the assembling operability.

The shield member may include a guide plate disposed along the junction box accommodating portion.

It is possible to more effectively prevent air from flowing into the junction box accommodating portion.

Air is prevented from flowing into the junction box by providing the shield member. Therefore, even though the junction box is provided in the battery pack case, it is possible to supply air to the batteries in a focused manner, and it is possible to effectively cool the batteries.

PREFERRED EMBODIMENT

An embodiment of the present invention will be described in accordance with the accompanying drawings. Although terms (e.g., terms including "up", "down", "side" and "end") indicating specific direction and position are used when needed in the following description, these terms are used to facilitate understanding of the invention with reference to the drawings, and the technical scope of the invention is not limited by the meanings of these terms. The following description is substantially merely exemplification, and the description is not intended to limit the invention, a subject to which the invention is applied and usage of the invention.

Figure 1:
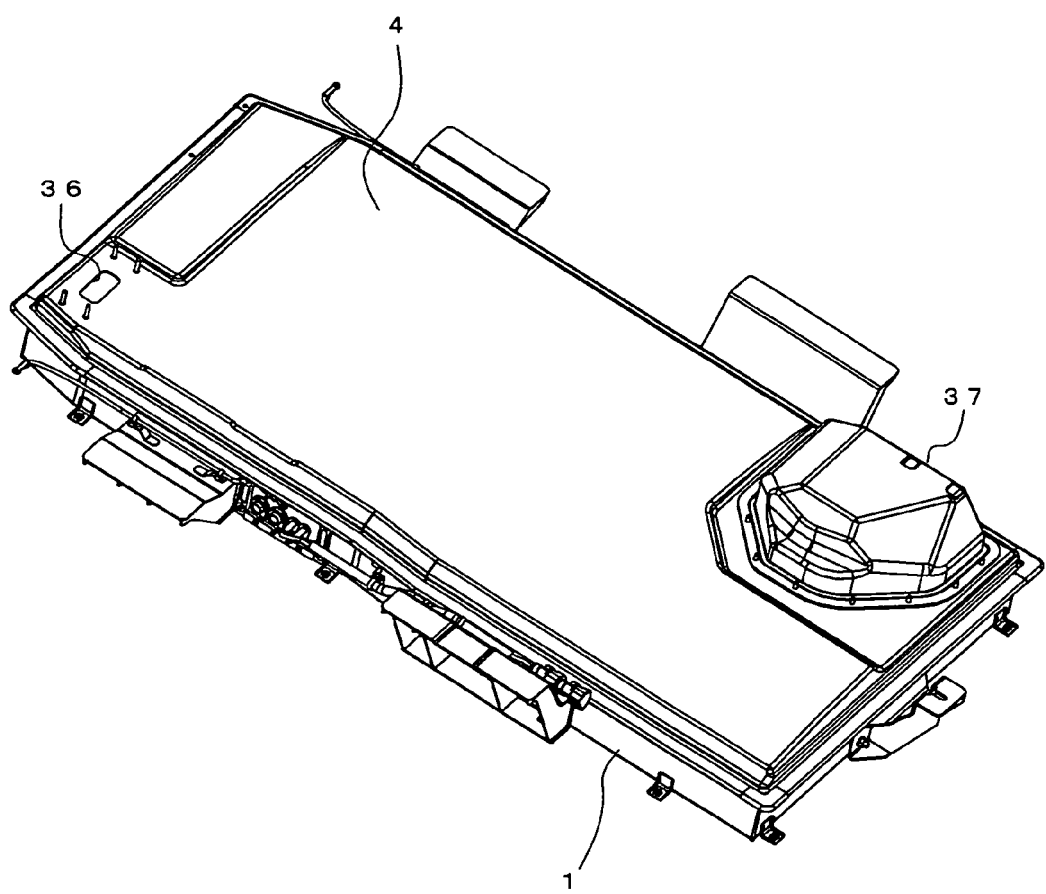
FIG. 1 is a perspective view of a battery pack according to an embodiment.
Figure 2:
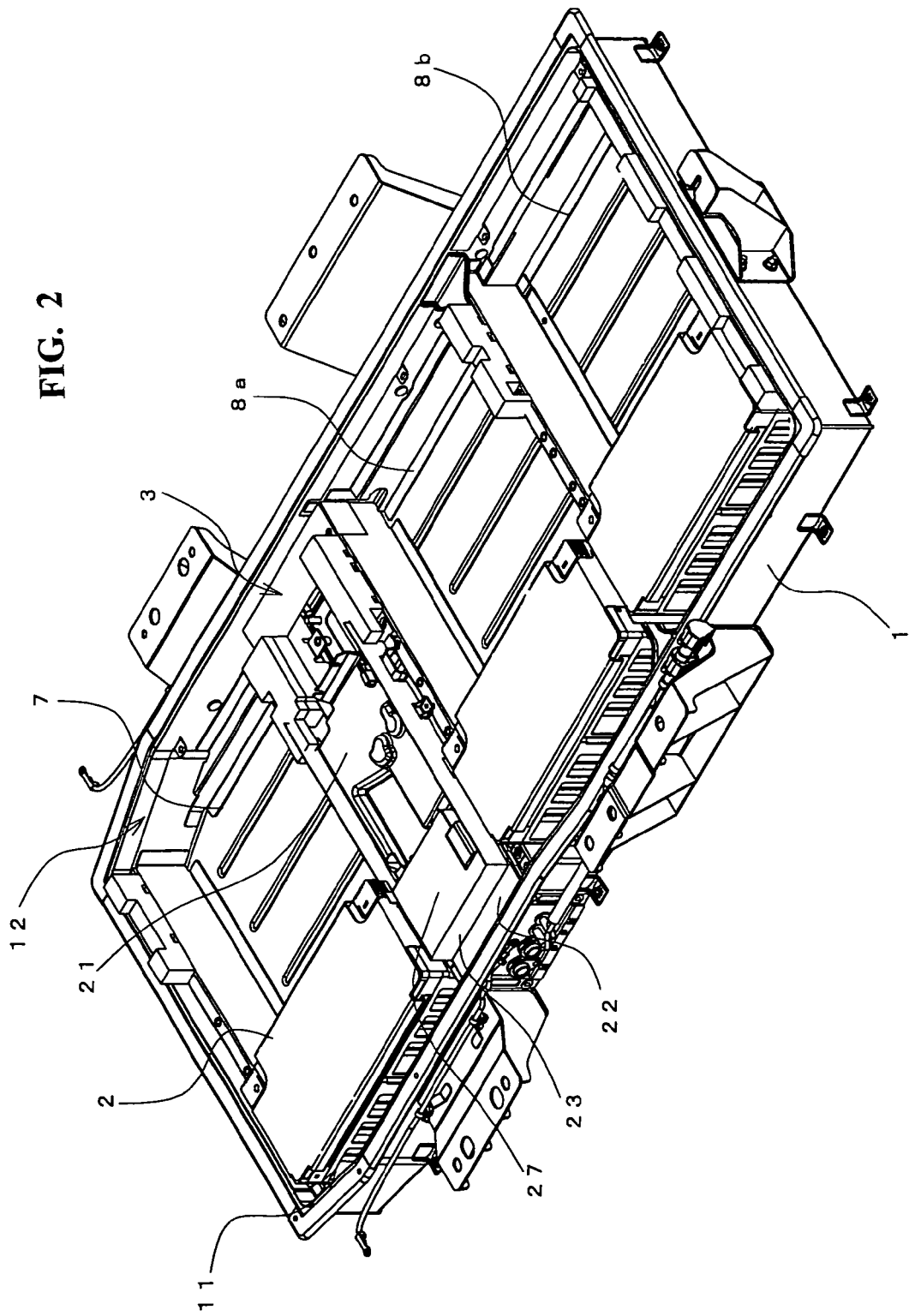
FIG. 2 is a perspective view showing a state where a battery pack cover and a portion of a battery module are removed from FIG. 1.

FIGS. 1 and 2 show a battery pack according to the embodiment. According to the battery pack, a plurality of battery modules 2 and a junction box 3 are accommodated in a battery pack case 1, and the battery pack case 1 is closed with a battery pack cover 4.

Figure 3:
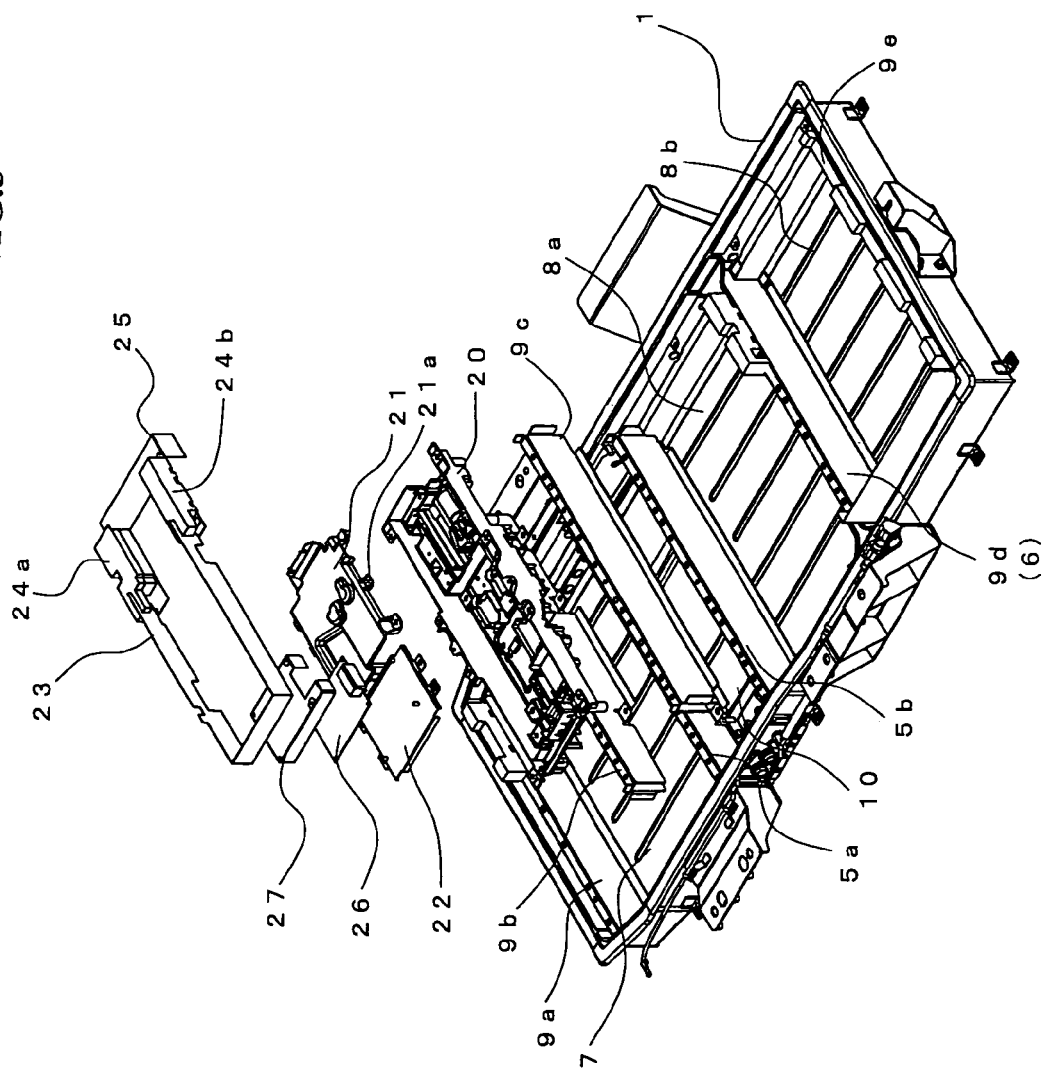
FIG. 3 is an exploded perspective view showing a state where the battery module is removed from FIG. 2.
Figure 4:
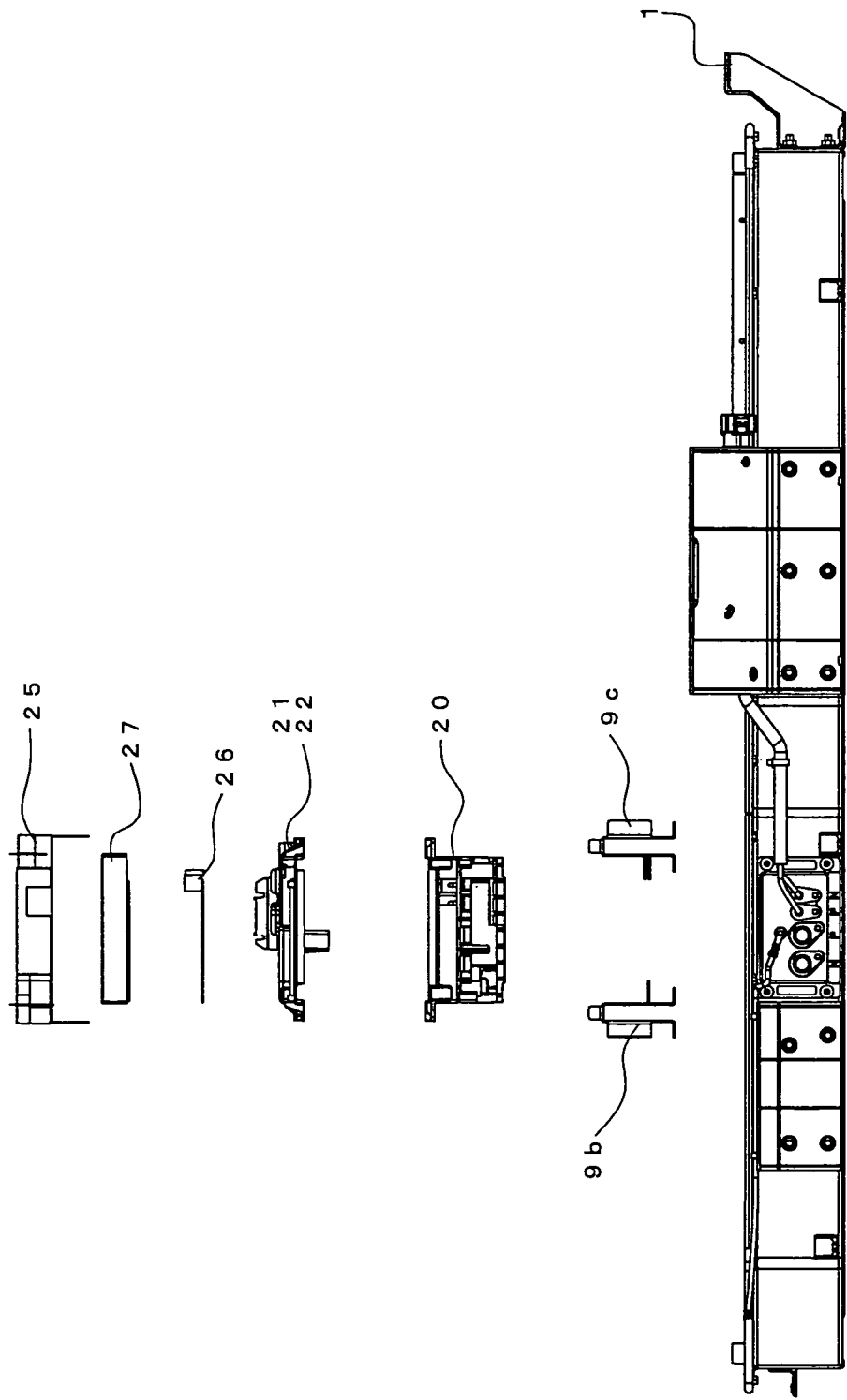
FIG. 4 is a front view of FIG. 3.

As shown in FIG. 3, the battery pack case 1 has a substantially box-like shape whose upper surface is opened. The battery pack case 1 is divided by two partition walls 5a and 5b and a partition portion 6 into three portions, i.e., a first battery accommodating portion 7 and second battery accommodating portions 8a and 8b. The partition walls 5a and 5b have interior spaces which are disposed at a predetermined distance from each other. Inner surfaces of both ends of the battery pack case 1, the partition walls 5a and 5b and the partition portion 6 are covered with partition covers 9a, 9b, 9c, 9d and 9e, respectively. A space between both the partition walls 5a and 5b is a junction box accommodating portion 10 (described as "JB accommodating portion" in the following description) in which the junction box 3 is disposed.

Figure 5:
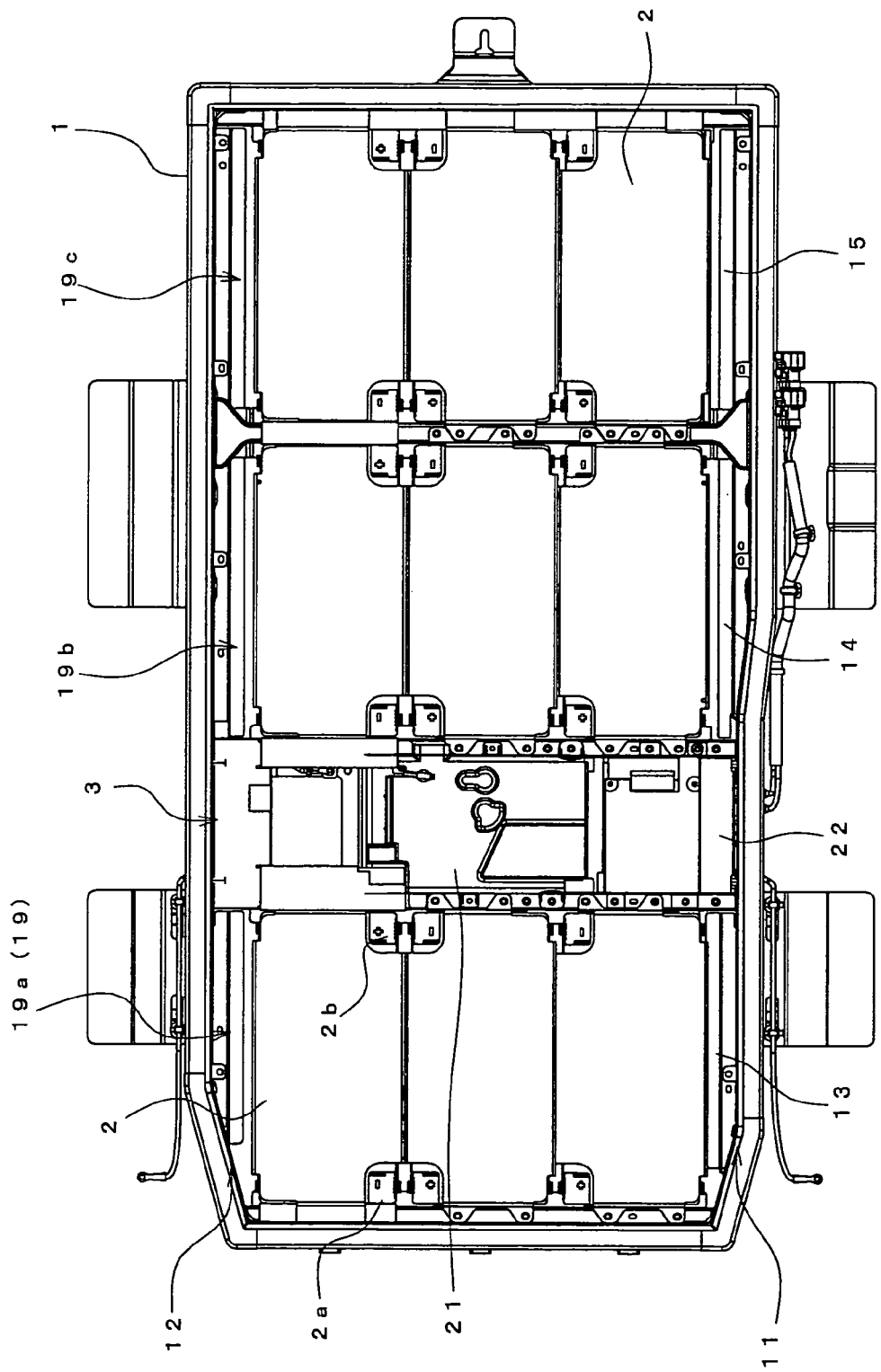
FIG. 5 is a plan view in which the battery module is added to FIG. 2.

As shown in FIG. 5, side air flow paths (first side air flow path 11 and second side air flow path 12) are formed on both sides of the battery pack case 1 and between a sidewall and the battery modules 2. The air flow paths 11 and 12 are in communication with the battery accommodating portions 7, 8a and 8b. In the following description, regions divided by the side air flow paths 11 and 12 are called as a first region 13, a second region 14 and a third region 15 in this order from an upstream side of air flow.

Figure 6:
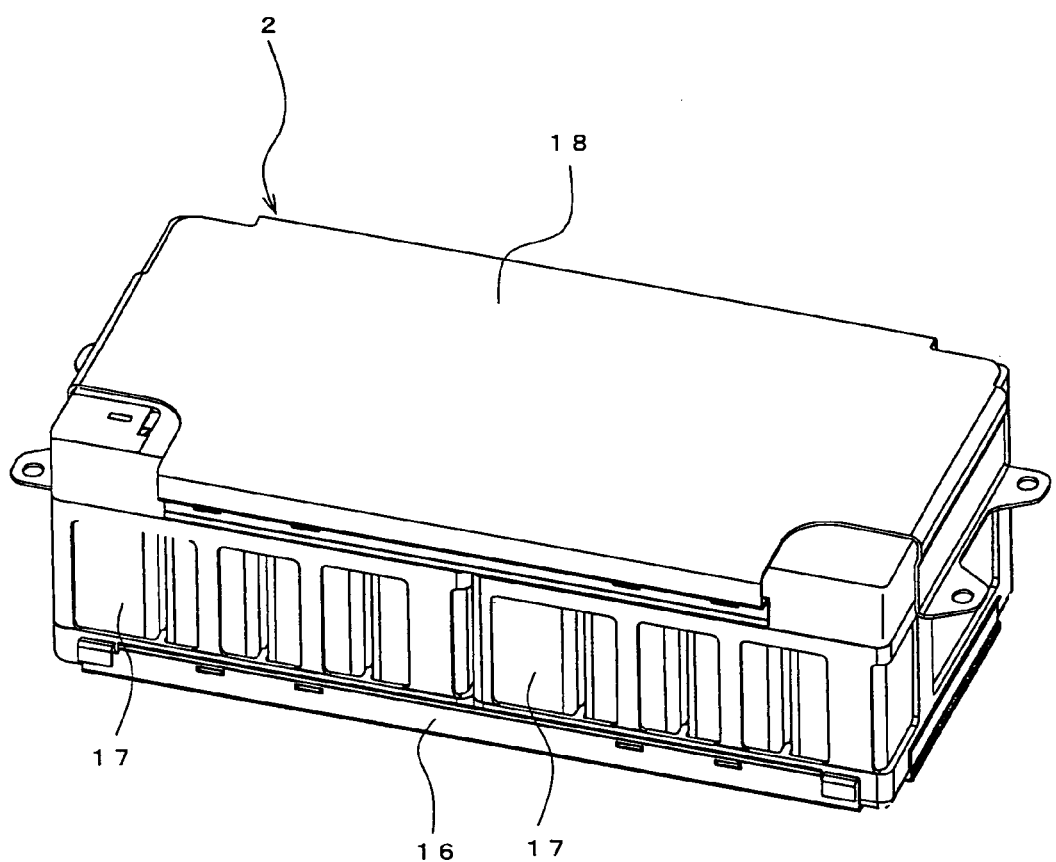
FIG. 6 is a perspective view of the battery module shown in FIG. 2.

As shown in FIG. 6, the battery module 2 is formed by accommodating a plurality of battery cells 17 at predetermined distances from one another in a battery module case 16, and by covering the battery module case 16 with a battery module cover 18. A plurality of battery module groups 19 (first module group 19a, second module group 19b and third module group 19c) arranged in parallel to one another are accommodated in the battery accommodating portions 7, 8a and 8b.

The battery cells 17 are electrically connected to one another in series. Each of the battery cells 17 is a non-aqueous electrolytic secondary battery such as a lithium-ion battery. The battery cell 17 has an electricity-generating element accommodated in a battery container that is sealed using a lid body. A plurality of openings are formed in the battery module case 16, air is made to flow between the battery cells 17 to cool the battery cells 17.

Positive and negative fixed electrode sections 2a and 2b are exposed from both ends of a side edge of the battery module 2. Here, all of the battery modules 2 have the same structures, and directions when the battery modules 2 are disposed in the battery pack case 1 are different from one another.

As shown in FIG. 3, the junction box 3 has a box body 20 having an opened upper surface, the box-like box body 20 including a control unit and a sensor, a bus bar (all not shown) and the like. A wire harness (not shown) is connected to the bus bar. The control unit supplies, through the bus bar, electric power from the battery cell 17 to a vehicle in which the battery pack is mounted, and detects a remaining amount of electric power of the battery cell 17 through the wire harness (not shown), and performs management by communication with a control unit in the vehicle.

By disposing the JB accommodating portion 10 in the battery pack case 1 in this manner, it is possible to shorten a distance from the JB accommodating portion 10 to each of the battery cells 17. Hence, it is possible to prevent a wiring operation from the JB accommodating portion 10 to the battery cell 17 from becoming complicated.

The box body 20 is covered with a junction box cover 21 and an auxiliary cover 22 made of synthetic resin having excellent insulation properties except a portion of an upper surface of the box body 20.

The junction box cover 21 is for covering the control unit and the like which are disposed on a central portion of the junction box 3 and which are essential electrical apparatuses. The junction box cover 21 includes tongue pieces 21a projecting from both sidewalls thereof, and the tongue pieces 21a are screwed to the partition walls 5a and 5b through the partition covers 9a and 9b.

Guide plates 23a and 23b are disposed on three sides of a periphery of the junction box cover 21. The guide plates 23a and 23b respectively extend along the partition walls 5a and 5b (JB accommodating portion 10), and the guide plates 23a and 23b are connected to each other along a later-described substrate cover 27. One ends of guide blocks 24a and 24b are respectively connected to both ends of the guide plates 23a and 23b, and an auxiliary plate 25 is disposed between the other ends of the guide blocks 24a and 24b. The guide plates 23a and 23b prevent air (cooling wind) which flows in the battery pack from flowing into the junction box 3, and allow air to sufficiently flow to the battery modules 2.

The auxiliary cover 22 is for covering one end side of the junction box 3, i.e., for covering an entire region on the side of the guide plates 23a and 23b where an electricity-leakage sensor, a bus bar and the like are disposed. Like the junction box cover 21, the auxiliary cover 22 includes tongue pieces 22a projecting from both sidewalls thereof, and the tongue pieces 22a are screwed to the partition walls 5a and 5b through the partition covers 9. The auxiliary cover 22 completely covers the electronic parts such as the electricity-leakage sensor and a wired portion such as a bus bar, and secures the insulation properties. A substrate 26 is provided on an upper surface of the auxiliary cover 22. The substrate 26 is covered with a substrate cover 27. An upper surface position of the substrate cover 27 has substantially the same height as that of an upper surface position of the battery pack case 1.

As shown in FIG. 1, the battery pack cover 4 is a plate-like body for covering an upper opening of the battery pack case 1, and an air-suction portion 36 and an air-exhaust portion 37 are respectively formed at diagonal positions of the battery pack cover 4. The air-suction portion 36 includes a rectangular opening and the air-suction portion 36 is connected to an air conditioner in the vehicle so that cold wind can be supplied.

Next, a flowing state of air in the battery pack having the above-described configuration will be described.

A portion of air supplied from the air-suction portion 36 flows into the first region 13 of the first side air flow path 11. A portion of air which flows into the first region 13 flows through the first battery accommodating portion 7 toward the second side air flow path. According to this air flow, the battery cells 17 of the battery module group 19 disposed in the first battery accommodating portion 7 are cooled. Remaining air which flows into the first region 13 flows while being guided by the junction box cover 21 and the auxiliary cover 22 which are shield members, and reaches the second region 14 and the third region 15 of the first side air flow path 11. Air which reaches the second region 14 flows toward the battery accommodating portion 8a, and air which reaches the third region 15 flows toward the battery accommodating portion 8b. That is, air which is changed in direction by the shield member flows toward the battery cells 17 of the battery modules 2 disposed on the side of the air-exhaust portion 37 with respect to the junction box 3, and cools the battery cells 17.

In each of the battery accommodating portions 7, 8a and 8b, flowing air flows through gaps of the battery cells 17 of the battery modules 2 to cool the battery cells 17. Air which flows through the battery accommodating portions 7, 8a and 8b flows toward the second side air flow path 12. Air which reaches the first region 13 flows into the second region 14 and then, the air which reaches the second region 14 flows into the third region 15 and then, flows out from the air-exhaust portion 37.

In this manner, air supplied from the air-suction portion 36 evenly flows through the region in the battery pack, but air is prevented from flowing into the junction box 3. An amount of heat generation in the junction box 3 is extremely smaller than that of the battery cell 17. Therefore, it is possible to effectively cool the battery cells 17 by suppressing an amount of air flowing into the junction box 3 and by securing an amount of air passing through the battery cells 17.

The present invention is not limited to the configuration described in the embodiment, and the invention can variously be modified.

For example, although the upper surface portion of the junction box 3 is covered with the junction box cover 21 and the auxiliary cover 22 in the embodiment, the upper surface portion of the junction box 3 can also be covered with one integral cover.

Heat transfer from the battery cell 17 may be suppressed by manufacturing the cover by a material having excellent heat insulating properties.

It is possible to positively cool electronic parts by forming an opening or a gap in a portion of the cover, and by taking a portion of cooling wind into the junction box 3 in a range not affecting the cooling effect of the battery cell 17.

Although the plurality of battery cells 17 are accommodated in the battery pack case 1 in the embodiment, the invention is not limited to this configuration, and even if one battery cell 17 is accommodated, it is possible to employ the configuration of the invention.

Although the JB accommodating portion 10 of the battery pack case 1 is covered with the junction box cover 21 and the auxiliary cover 22 in the embodiment, the JB accommodating portion 10 may be covered with a portion of the battery pack cover 4. For example, it is possible to employ such a configuration that a portion of the battery pack cover 4 is deformed, a control unit and the like disposed at central portion of the junction box 3 are covered, and an entire region on the side of one end of the junction box 3 is covered.

As the battery pack of the present invention, it is possible to employ various batteries such as a lead-acid battery in addition to the lithium-ion battery.

What is claimed is:

1. A battery pack comprising:
   a battery pack case including a junction box accommodating portion, a battery accommodating portion, an air-suction portion and an air-exhaust portion;
   a junction box accommodated in the junction box accommodating portion of the battery pack case;
   a pair of partition walls which separate the junction box accommodating portion from the battery accommodating portion;
   a plurality of batteries accommodated in the battery accommodating portion of the battery pack case, at least a portion of the batteries being disposed on a side of the air-exhaust portion with respect to the junction box accommodating portion; and
   a shield member which covers the junction box accommodating portion and is configured to prevent air supplied from the air-suction portion from flowing into the junction box accommodating portion,
   wherein the battery pack case includes a first pair of sidewalls and a second pair of sidewalls connected to the first pair of sidewalls, and the junction box accommodating portion is formed between the first and second pair of sidewalls,
   wherein a wind channel is formed between the first and second pair of sidewalls, and the junction box and the shield member are formed in the wind channel,
   wherein the plurality of batteries and the shield member share the same wind in the wind channel, and the shield member restricts a flow of the wind in the wind channel, and
   wherein the battery pack case further comprises a bottom wall, the first and second pair of sidewalls projecting upward from the bottom wall, and the junction box accommodating portion being bounded by the bottom wall, the shield member, the first pair of sidewalls, and the pair of partition walls.

2. The battery pack according to claim 1, wherein the shield member comprises a material having insulation properties, and the shield member covers an electronic part at least in the junction box.

3. The battery pack according to claim 2, wherein the shield member includes a junction box cover which covers a control unit in the junction box.

4. The battery pack according to claim 3, wherein the shield member further includes an auxiliary cover which covers a region from the junction box cover to a side surface in the battery pack case.

5. The battery pack according to claim 3, wherein the shield member includes a guide plate disposed along the junction box accommodating portion.

6. The battery pack according to claim 4, wherein the battery accommodating portion comprises a plurality of battery accommodating portions including a first battery accommodating portion formed on a side of the air-suction portion with respect to the junction box accommodating portion and a second battery accommodating portion formed on the side of the air-exhaust portion with respect to the junction box accommodating portion.

7. The battery pack according to claim 6, wherein the pair of partition walls includes a first partition wall formed between the junction box accommodating portion and the first battery accommodating portion and a second partition wall formed between the junction box accommodating portion and the second battery accommodating portion.

8. The battery pack according to claim 7, wherein the junction box cover includes a projecting portion which projects from a sidewall of the junction box cover and is fixed to a partition wall of the first and second partition walls.

9. The battery pack according to claim 7, wherein the junction box cover includes a guide plate formed along a periphery of the junction box cover.

10. The battery pack according to claim 9, wherein the guide plate extends along a partition wall of the first and second partition walls.

11. The battery pack according to claim 9, wherein the junction box cover further includes a substrate and a substrate cover, and the guide plate comprises a pair of guide plates which are connected along the substrate cover.

12. The battery pack according to claim 11, wherein the junction box cover further includes:
   a pair of guide blocks and an auxiliary plate formed at an end of the pair of guide blocks, another end of the pair of guide blocks being connected to the pair of guide plates.

13. The battery pack according to claim 6, wherein the pair of partition walls include including a first partition wall formed between the junction box accommodating portion and the first battery accommodating portion and a second partition wall formed between the junction box accommodating portion and the second battery accommodating portion,
   wherein the auxiliary cover includes a projecting portion which projects from a sidewall of the junction box cover and is fixed to a partition wall of the first and second partition walls.

14. The battery pack according to claim 4, further comprising:
   a substrate formed on an upper surface of the auxiliary cover, and a substrate cover which is formed on the substrate.

15. The battery pack according to claim 4, wherein the battery pack case further comprises a battery pack cover which is formed on an opening in the battery pack case and includes the air-suction portion and the air-exhaust portion, and wherein the battery pack cover comprises a plate-shape, the air-suction portion comprises an opening in the battery pack cover and the air-exhaust portion is formed diagonally from the air-suction portion.

16. A battery pack comprising:
a battery pack case comprising:
an junction box accommodating portion;
an air-suction portion formed on a first side of the junction box accommodating portion;
an air-exhaust portion formed on a second side of the junction box accommodating portion which is opposite the first side; and
a battery accommodating portion which accommodates a plurality of batteries, and is formed on the second side of the junction box accommodating portion;
a junction box accommodated in the junction box accommodating portion of the battery pack case;
a pair of partition walls which separate the junction box accommodating portion from the battery accommodating portion;
a plurality of batteries accommodated in the battery accommodating portion of the battery pack case; and
a shield member formed on the junction box accommodating portion and configured to inhibit air from the air-suction portion from flowing into the junction box accommodating portion;
wherein the battery pack case includes a first pair of sidewalls and a second pair of sidewalls connected to the first pair of sidewalls, and the junction box accommodating portion is formed between the first and second pair of sidewalls,
wherein a wind channel is formed between the first and second pair of sidewalls, and the junction box and the shield member are formed in the wind channel,
wherein the plurality of batteries and the shield member share the same wind in the wind channel, and the shield member restricts a flow of the wind in the wind channel, and
wherein the battery pack case further comprises a bottom wall, the first and second pair of sidewalls projecting upward from the bottom wall, and the junction box accommodating portion being bounded by the bottom wall, the shield member, the first pair of sidewalls, and the pair of partition walls.

17. The battery pack according to claim 1, further comprising:
a battery pack cover which closes an opening formed by the first and second pairs of sidewalls of the battery pack case, and includes the air-suction portion and the air-exhaust portion.

18. The battery pack according to claim 6, wherein the plurality of batteries comprises a first plurality of batteries formed in the first battery accommodating portion and a second plurality of batteries formed in the second battery accommodating portion, and
wherein a first wall of the first pair of sidewalls is separated from the first and second battery accommodating portions by a first air path of the wind channel, and a second wall of the first pair of sidewalls is separated from the first and second battery accommodating portions by a second air path of the wind channel.

19. The battery pack according to claim 18, wherein the pair of partition walls includes a first end which is connected to the first wall of the first pair of sidewalls, and a second end which is connected to the second wall of the first pair of sidewalls.

20. A battery pack comprising:
a battery pack case comprising:
a bottom wall;
a first pair of sidewalls and a second pair of sidewalls connected to the first pair of sidewalls, the first and second pair of sidewalls projecting upward from the bottom wall;
a junction box accommodating portion formed between the first and second pair of sidewalls;
a plurality of battery accommodating portions comprising:
a first battery accommodating portion which is formed on a first side of the junction box accommodating portion and accommodates a first plurality of batteries; and
a second battery accommodating portion which is formed on a second side of the junction box accommodating portion opposite the first side, and accommodates a second plurality of batteries;
a battery pack cover which closes an opening formed by the first and second pairs of sidewalls of the battery pack case, and comprises:
an air-suction portion formed on the first side of the junction box accommodating portion; and
an air-exhaust portion formed on the second side of the junction box accommodating portion;
a junction box accommodated in the junction box accommodating portion of the battery pack case;
a shield member formed on the junction box accommodating portion and configured to inhibit air from the air-suction portion from flowing into the junction box accommodating portion; and
a pair of partition walls which separate the junction box accommodating portion from the battery accommodating portion, the junction box accommodating portion being bounded by the bottom wall, the shield member, the first pair of sidewalls, and the pair of partition walls.

* * * * *